Patented Aug. 4, 1953

2,647,933

UNITED STATES PATENT OFFICE 2,647,933

MAKING OF $R_fBr$ FROM $R_fCOOH$

James D. La Zerte, St. Paul, Wilbur H. Pearlson, Bald Eagle, White Bear Township, Ramsey County, and Edward A. Kauck, St. Paul, Minn., assignors to Minnesota Mining & Manufacturing Company, St. Paul, Minn., a corporation of Delaware No Drawing. Application February 19, 1951, Serial No. 211,792

7 Claims. (Cl. 260—653)

The present invention relates to a new and improved method of making fluorocarbon bromides, such as may be illustrated by the formula $R_fBr$, where $R_f$ is a fluorocarbon radical.

Fluorocarbon bromides have previously been made, by one method or another. For example, see Waterman U. S. Patent No. 2,531,372, Simons et al. U. S. Patent No. 2,506,652, an article entitled "Fluorocarbon Bromides" by Brice et al. appearing in the Journal of the American Chemical Society, vol. 68, pages 968–969 (June 1946), an article appearing in the Journal of the American Chemical Society, vol. 64, pages 1157–1159 (1942) and an article appearing in the Journal of the American Chemical Society for December 1940, pages 3477 and 3480. It will be noted that the Waterman U. S. Patent No. 2,531,372 suggests producing trifluorobromomethane (which is a fluorocarbon bromide) by heating a mixture of carbon tetrabromide, antimony trifluoride and bromine to a temperature of 180–220° C. under a pressure of 60–80 pounds gauge for a period of time. Simons et al. U. S. Patent No. 2,506,652 reacts a fluorocarbon, i. e., $C_nF_{2n+2}$, with bromine to effect brominolysis of the same, i. e., splitting the molecule of starting material at a carbon-to-carbon bond, thus making two molecules of the fluorocarbon bromide per molecule of starting material.

The foregoing and other methods tried in the prior art have drawbacks in comparison with the method of our present invention. We have found that we can successfully and efficiently produce fluorocarbon bromides by reacting bromine with the corresponding fluorocarbon acid. The reaction may be indicated as:

$$R_fCOOH + Br_2 \rightarrow R_fBr + CO_2 + HBr$$

We have also found that instead of using the acid, we may employ the corresponding anhydride and react it with bromine. This reaction may be indicated as follows:

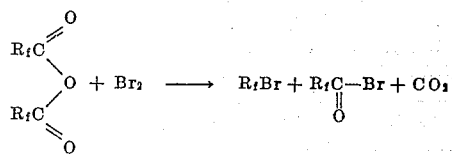

It will be noted that in addition to the desired $R_fBr$, the above reaction also yields a perfluoro acid bromide, i. e.,

The last-mentioned by-product, however, can readily be converted to the desired fluorocarbon bromide by heating, as indicated by the following equation:

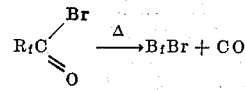

Where desired the reaction of the anhydride with bromine and the conversion of the perfluoro acid bromide to the desired fluorocarbon bromide by heat can be accomplished as a single operation, thus in effect producing two mols of fluorocarbon bromide from one mol of the corresponding perfluoro acid anhydride.

Fluorocarbon acids are readily available by processes heretofore disclosed. For example, the basic electrochemical process of the Simons U. S. Patent No. 2,519,983 will directly yield perfluoro acid fluorides, such as the $CF_3COF$ (trifluoroacetyl fluoride) disclosed in column 18 of the patent. The trifluoroacetyl fluoride is readily converted by hydrolysis with water to the corresponding perfluoro acid, i. e., $CF_3COOH$. Other perfluoro acid fluorides are likewise readily converted by hydrolysis to the corresponding fluorocarbon acids.

The subject matter of Simons U. S. Patent No. 2,519,983 was disclosed to the public a considerable period of time prior to the grant of the patent, as will be seen from the specification of that patent, col. 1, lines 22–36. Trifluoroacetic acid (an example of a fluorocarbon acid), made by other processes was known a considerable time prior to Simons' date of invention; for example see Bull. Sci. Acad. roy. Belg., volume 8, pages 343–70 (1922), Chem. Abs., vol. 17, page 769 (1923), which discloses trifluoromethylcyclohexanone and the oxidation thereof to trifluoroacetic acid. Thus it will be apparent that trifluoroacetic acid, a perfluoro acid, has been available for a great many years, and it also will be apparent that various other fluorocarbon acids have also been available for a considerable period of time. It will also be clear that bromine, applicants' other reactant, has been available for an even longer time.

As will be apparent from what has already been said, an important object of our invention is to provide an improved method of making fluorocarbon bromides. Another object is to provide a method of producing fluorocarbon bromides which provides high yields. A further object is to provide a process by which a wide range of fluorocarbon bromides can be produced. Still another object of our invention is to provide a process where the position of the bromine in the final product molecule can be determined very definitely, by virtue of the choice of starting material. These and other objects and advantages will appear from the application taken as a whole.

Fluorocarbon carboxylic acids can be readily converted to the corresponding bromides, according to our invention, by passage through a heated furnace in the presence of bromine at relatively low temperatures, which, however, are substantially above normal atmospheric temperatures. While the reaction proceeds in an empty tube, the addition of various catalytic surfaces provide certain advantages, resulting in increased yields.

The exact temperature varies with the acid used, the catalyst used, the yield desired, and the space velocity, but temperatures of 150° to 600° C. or 650° C. are feasible. Below about 150° the reaction rate becomes quite slow; at temperatures above 600° or 650°, secondary pyrolytic processes cause a decrease in yield.

Space velocity is relatively unimportant, since the products are stable under the reaction conditions and are readily separated from the unreacted starting material, which can be recirculated.

The ratio of reactants is not critical. In general, an excess of bromine will be used to insure maximum yield of bromide and minimum side reaction of the acid. Excess reactants can be separated from the reaction products by condensation, separation of phases, etc.

In order to illustrate our invention in various specific respects, a number of specific examples will now be disclosed.

EXAMPLE I

The apparatus consisted of a 1″ iron pipe containing a ¾″ carbon tube and heated over a 12″ section by a Hoskins resistance furnace. Temperatures were recorded by thermocouple between the pipe and the furnace walls. The liquid reactants were dropped from burettes into an entrance line and the gaseous products were condensed in a series of traps cooled successively by ice and liquid air. The first trap removed most of the unreacted bromine and acid. The condensate from the second trap was scrubbed with aqueous base and the effluent was distilled to yield a pure fluorocarbon bromide, which was identified by infrared spectroscopy.

The reaction zone was packed with granular activated carbon. Over a period of two hours, 70 grams of bromine and 50 grams of trifluoroacetic acid were added to the reactor at a temperature of 540° C. Two grams of unreacted acid and only a trace of unreacted bromine were recovered. After removal of the carbon dioxide and hydrogen bromide from the condensate in the liquid air-cooled trap, 30 grams of material remained which was shown, by infrared analysis, to consist of 95% $CF_3Br$, the remainder being largely $CF_3H$. The use of either fractional low-temperature distillation or selective adsorption was adequate for preparing pure $CF_3Br$.

EXAMPLE II

The apparatus described above was used except that no packing was present in the heated section, which was maintained at 450° C. Seventy percent of the trifluoroacetic acid was recovered. From the reacted portion a 35% yield of $CF_3Br$ was obtained.

Data describing other runs involving the reaction of bromine with trifluoroacetic acid follows in the table below.

*Brominolysis of trifluoroacetic acid*

| Reactor | Catalyst | Temp., °C. | Percent Conversion to $R_fBr$ |
|---|---|---|---|
| Glass | Active Carbon | 300 | 56 |
| Graphite | Active Carbon; Silver Bromide | 350 | 60 |
| Do | Active Carbon; Zinc Bromide | 300 | 15 |
| Do | Active Carbon; Aluminum Bromide | 300 | 96 |

EXAMPLE III

Reaction of pentafluoropropionic acid with bromine over active carbon in the apparatus described in Example I at a temperature of 350° C. resulted in 97% conversion and 80% yield of pentafluoroethyl bromide.

EXAMPLE IV

Through the same apparatus, using a tube packed with granular activated carbon maintained at 350° C., 284 grams of perfluorobutyric acid, $C_3F_7CO_2H$, and 312 grams $Br_2$ were passed during a period of four hours. The products, which included $C_3F_7Br$, $C_3F_7H$, $CO_2$, and HBr as well as excess bromine, were scrubbed with aqueous potassium hydroxide. Three hundred grams of material not absorbed by the base were distilled in a low-temperature, helix-packed fractionating column, from which was obtained a 250 gram fraction boiling at 14.0° C., identified as purified n-$C_3F_7Br$ by its infrared spectrum. The remaining fractions contained large amounts of $CF_3F_7Br$ contaminated with $C_3F_7H$, separable by further distillation.

EXAMPLE V

Perfluorocaprylic acid, $C_7F_{15}COOH$, (0.10 mol) when reacted with bromine (0.19 mol) over active carbon at 350° C. in the above described apparatus, produced a 31% yield of n-perfluoroheptyl bromide, $C_7F_{15}Br$. The product had a refractive index of 1.3010 at 25° C. and a boiling point of 118.0 to 118.5° C.

EXAMPLE VI

Perfluorocyclohexanecarboxylic acid, c-$C_6F_{11}COOH$, was reacted with a 50 mol percent excess of bromine in the presence of active carbon at an inside temperature (i. e., measured in the reaction zone) of 230° C. to produce a fraction (perfluorocyclohexyl bromide) which upon further fractionation had a refractive index of 1.3226 at 25° C. and a boiling point of 90 to 90.8° C. The percentage of bromine was found to be 22.6, as compared with the theoretical value of 22.2 for perfluorocyclohexyl bromide.

According to our invention, the brominolysis of perfluoro acid anhydrides, instead of the perfluoro acids, can be carried out under essentially the same conditions noted above. As previously indicated, the reaction essentially involves two steps, one being the formation of a mol of perfluoroalkyl bromide and a mol of perfluoro acyl bromide, and the other decomposition of the perfluoro acyl bromide( often at still higher temperatures) to another mol of perfluoroalkyl bromide. The following examples will illustrate this reaction.

EXAMPLE VII 49.5 grams (0.24 mol) of perfluoroacetic anhydride was reacted with 64.0 grams (0.40 mol) of bromine, in a carbon-lined tube filled with active carbon at a temperature of 300° C. The products, consisting of $CF_3Br$ and $CF_3COBr$, were then separated and the acid bromide pyrolyzed in an empty carbon-lined tube at 650° C. to produce substantially quantitative yields of $CF_3Br$.

EXAMPLE VIII

Perfluorobutyric anhydride (1.03 mols) was reacted with 1.75 mols of bromine, using the same apparatus and catalysts described in the previous example, at a temperature of 350° C. Reaction of the anhydride to the perfluoro n-propyl bromide, $C_3F_7Br$, was effected in 66% yield, together with a lesser amount of perfluorobutyryl bromide.

It will be noted that the two steps mentioned in Example VII were, in the present example, effectively accomplished in one step. Use of a higher temperature in Example VII would likewise reduce the over-all reaction to the single step.

Whereas the brominolysis of only monocarboxylic acids and acid anhydrides is illustrated in the foregoing examples, our method is also intended for use with dicarboxylic acids, as for example perfluorosuccinic, perfluoroadipic and perfluorocyclohexane-1, 3-dicarboxylic acids, and with dicarboxylic acid anhydrides, such as perfluorosuccinic acid anhydride.

Reactors can be constructed of any material inert to bromine and acid at these temperatures, such as steel, graphite, glass, porcelain, platinum, etc. While gas-phase reactions are satisfactory, the reactants may be maintained as liquids by the use of adequate pressure.

While our method has been illustrated hereinabove in connection with certain specific perfluorocarbon acids and their anhydrides, it will be understood that it is intended for use with perfluorocarbon acids generally, and with the anhydrides thereof. Also while our method is illustrated hereinabove with certain specific reaction temperatures, catalysts, etc., it is to be understood that we contemplate a wide range of variations in catalysts (or no catalysts), reaction temperatures, etc., where bromine and a perfluorocarbon acid or anhydride are being reacted, as herein described, to produce perfluorocarbon bromides. All modifications and variations which are herein suggested and/or which come within the scope of the appended claims are comprehended.

What we claim is:

1. The method of producing perfluorocarbon bromides which comprises reacting bromine with a compound from the group consisting of perfluorocarbon acids and their anhydrides.

2. The method of producing a perfluorocarbon bromide which comprises reacting (1) a corresponding compound from the group consisting of perfluorocarbon acids and their anhydrides, with (2) at least about an equal molar proportion of bromine, the reaction being carried out at an elevated temperature of the order of 150° to 650° C.

3. The method of producing trifluoromethyl bromide, $CF_3Br$, which comprises reacting (1) a compound from the group consisting of trifluoroacetic acid and trifluoroacetic acid anhydride, with (2) at least about an equal molar proportion of bromine at a temperature elevation within the approximate range of 150° to 650° C.

4. The method of producing trifluoromethyl bromide, $CF_3Br$, which comprises reacting trifluoroacetic acid with at least about an equal molar proportion of bromine at a temperature elevation of the order of 350° C.

5. The method of producing trifluoromethyl bromide, $CF_3Br$, which comprises reacting trifluoroacetic acid anhydride with at least about an equal molar proportion of bromine at a temperature elevation of the order of 350° C.

6. The method of producing a perfluorocarbon bromide containing at least three carbon atoms in the molecule, and which is a liquid under normal room temperatures and pressures, which comprises reacting (1) a corresponding compound from the group consisting of perfluorocarbon acids and their anhydrides, with (2) at least an equal molar proportion of bromine, the reaction being carried out at an elevated temperature of the order of 350° C.

7. The method of producing perfluoroethyl bromide, $C_2F_5Br$, which comprises reacting perfluoropropionic acid with at least about an equal molar proportion of bromine at a temperature elevation of the order of 350° C.

JAMES D. LA ZERTE.
WILBUR H. PEARLSON.
EDWARD A. KAUCK.

References Cited in the file of this patent

UNITED STATES PATENTS

| Number | Name | Date |
|---|---|---|
| 2,436,135 | Barrick et al. | Feb. 17, 1948 |
| 2,554,219 | Simons et al. | May 22, 1951 |